United States Patent Office 3,136,132
Patented June 9, 1964

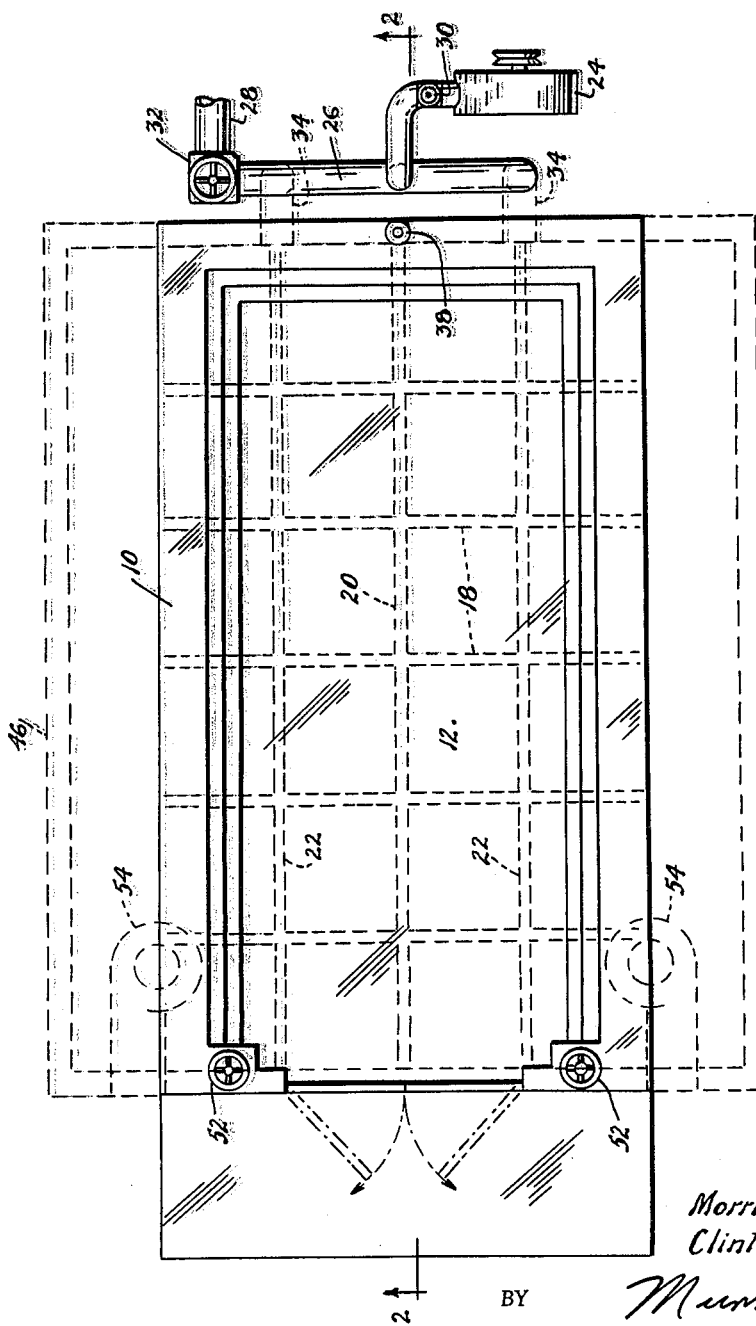

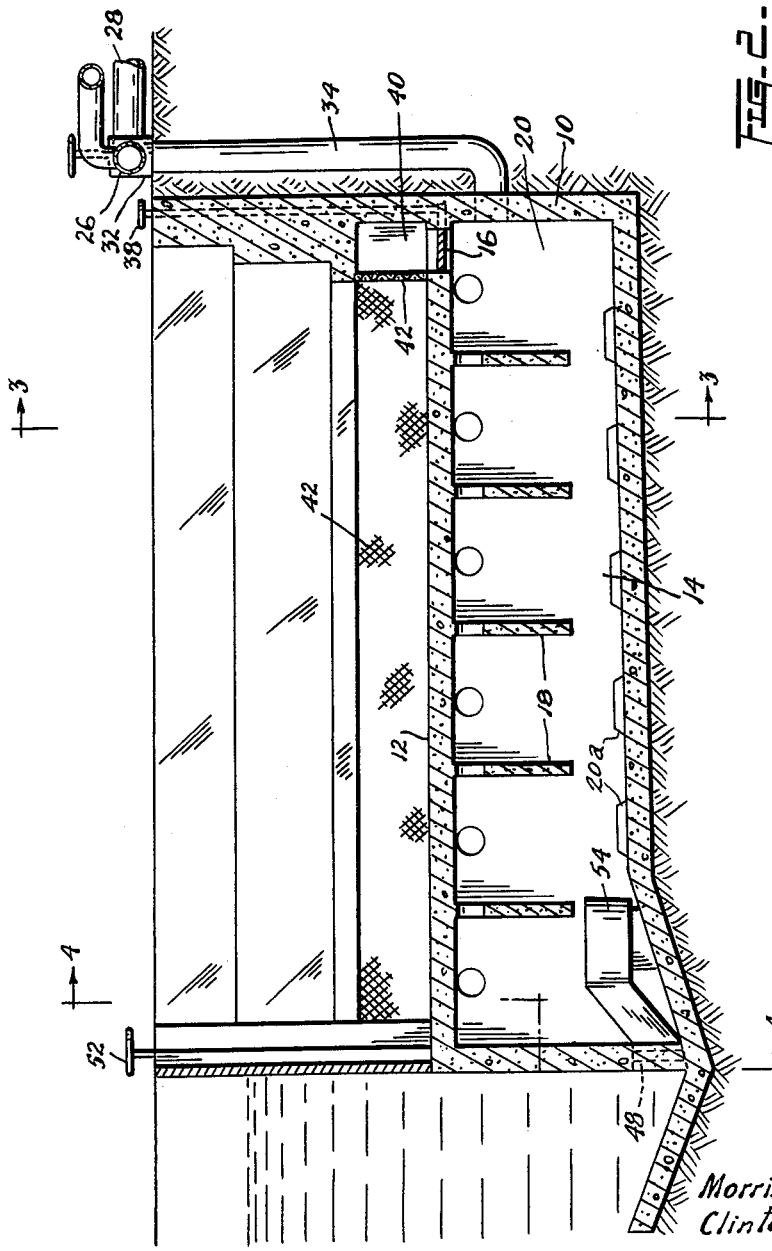

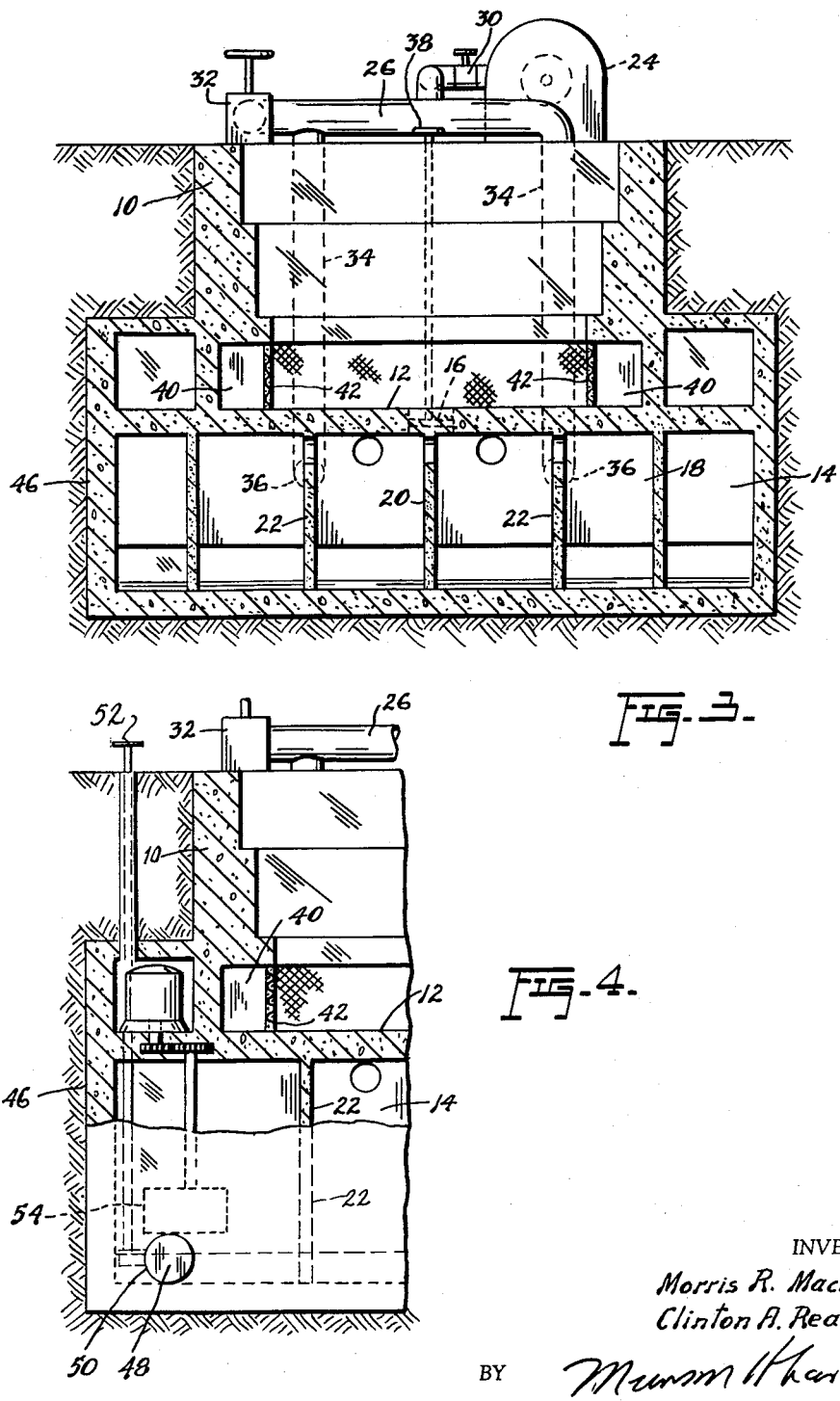

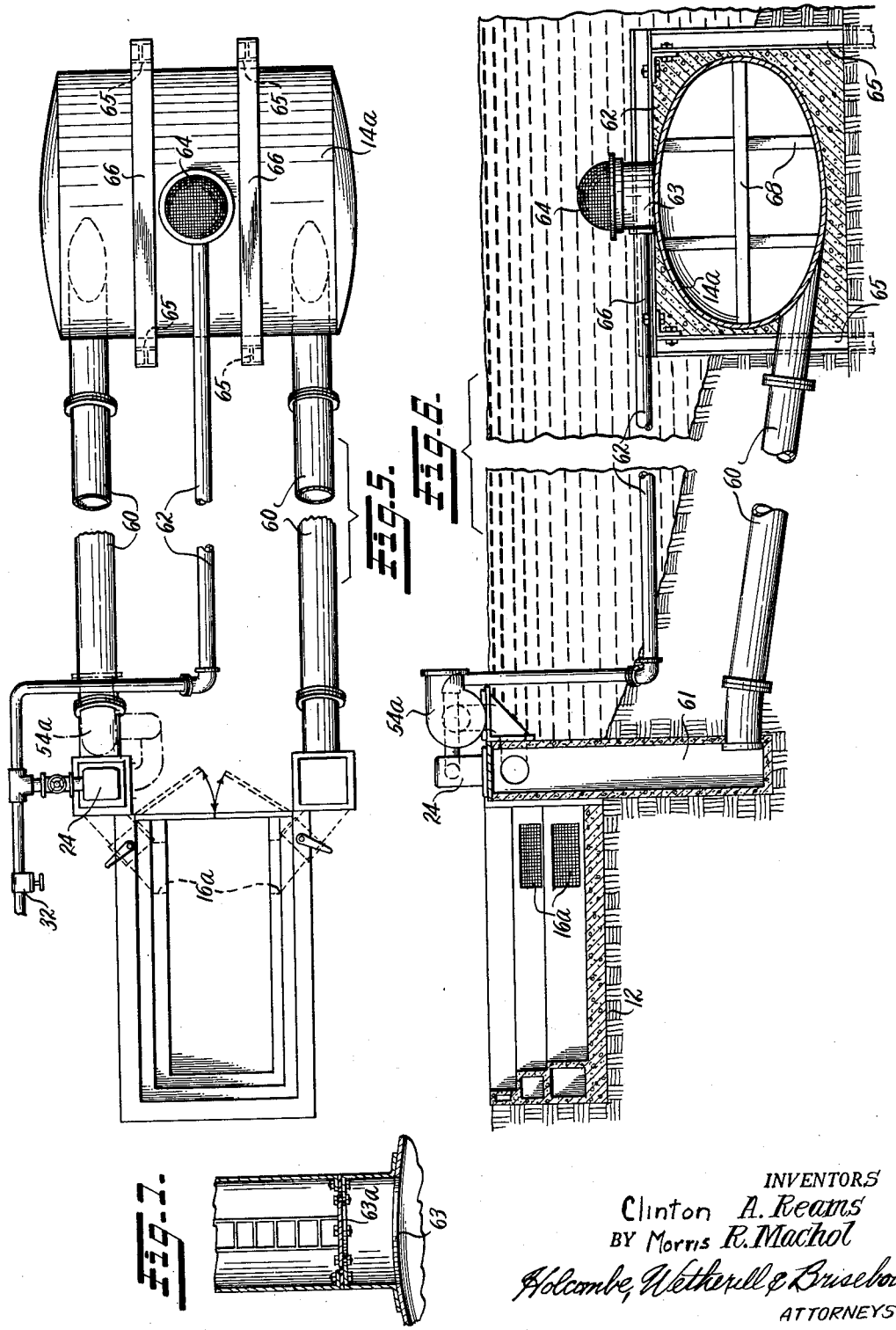

3,136,132
MEANS FOR UNWATERING GRAVING DOCKS
Morris R. Machol, 25 5th Ave., New York, N.Y.,
and Clinton A. Reams, 1920 S St. NW., Washington, D.C.
Filed Dec. 16, 1960, Ser. No. 76,415
6 Claims. (Cl. 61—64)

This invention relates to the unwatering of graving docks often called dry docks and is a continuation-in-part of application No. 510,895 filed May 25, 1955, and now abandoned. Such a dock is an oblong excavation on the water's edge with a movable gate. When the gate is open and the dock filled with water, a ship is sailed or warped into the dock. The gate is then closed and the water pumped out so that work or hull inspection can be accomplished on the underwater body of the ship.

In the operation of a dry dock, time is of the essence, first because the hourly cost of operating the dry dock or allowing it to lie idle is very considerable and in times of emergency, such as during war-time, is critical. Further, keeping a large ship idle in a large dry dock is very expensive.

Normally, the aim of the designer is to unwater a small dock in 5 to 6 hours and a large dock in twenty-two or twenty-three hours. One purpose of this invention is to enable a dock to be unwatered in a matter of minutes.

It requires an extremely large pumping plant capacity for emptying a large dry dock even to achieve the twenty-two or twenty-three hour goal. On a large dock this requires capacity to pump 250,000 to 300,000 gallons of water per minute. The pumps and motors to give this capacity represent a critical and very considerable investment. Also, the amount of power required is so great that where a public utility is supplying that power it becomes necessary to give notice at least a day in advance so that the additional boiler and generator capacity can be provided. On the other hand, where a shipyard is making its own power, the extra capital investment in additional engines, generators and boilers is a very considerable item of expense. One of the elements of high cost of constructing a graving dry dock is the frequent necessity of a heavy bottom bed of concrete twenty to twenty-four feet thick to resist the upward hydrostatic pressure when the dock is empty of water and has no ship in it. This invention further eliminates this thick bed of concrete.

One object of this invention is to more rapidly dump water from the dry dock into an underground tank in minutes of elapsed time.

Another object of this invention is to empty the underground reservoir by a combination of air pressure and pumps. Since a ship is undergoing repair for several days usual practice allows a continuous unwatering or draining of this underground reservoir to take place over a period of several days, eliminating the necessity of excessive power demand as is required to drain any like dry dock in the normal manner and by the present generally adopted methods.

The present invention not only reduces the unwatering time to a manner of minutes but also eliminates the thick bed of concrete as well as the power consuming pumps and motors and the consequent need for a tremendous source of power for a short time.

Specifically, this invention consists of the unique combination of old and proven components, namely, an underground reservoir or sealed chamber, air compressors, axial flow pumps, valves, including gate valves and spectacle valves, together with conventional steel and concrete construction and piping.

Further, this present invention proposes further utilization of the well known principle that as the head of water increases, the volume of water moved by any given pump decreases. With exerted pressure of air over and upon the surface of the water residual in the underground reservoir described in this invention, said pressure equals the head of water including both static and friction, thereupon the pumps operate as though they were moving water from place to place and not lifting it. Consequently in this application a given pump with a small horsepower motor will move greater quantity of water at a gallons per hour rate.

The invention will be more readily understood by reference to the accompanying drawings and the following detailed description, in which specific embodiments of the invention are set forth by way of illustration rather than by way of limitation.

In the drawings:

FIGURE 1 is a plan view of a graving dock embodying the invention;

FIGURE 2 is a vertical, longitudinal sectional view taken substantially in the plane of the line 2—2 in FIGURE 1;

FIGURE 3 is a transverse sectional view, taken substantially in the plane of the line 4—4 in FIGURE 2;

FIGURE 4 is a fragmentary transverse sectional view taken substantially in the plane of the line 4—4 in FIGURE 2;

FIGURE 5 is a plan view showing an alternative embodiment of our invention in which the tank is at some distance from the dock;

FIGURE 6 is a vertical section through the dock and the tank; and

FIGURE 7 shows a section of the manhole at the top of the tank.

With reference to FIGS. 1 to 4 the following describes the invention:

10 represents the peripheral shell of the dry dock, which may be made of concrete.

12 is the bottom or floor or the dry dock. The level of the floor of the dry dock is, of course, sufficiently below the level of the outside water to permit a ship to be floated into the dry dock, as will be apparent to those skilled in the art.

14 is a subterranean reservoir, preferably under the dock itself, although it may consist of one or multiple tanks at a distance from the dock, or a combination of both where the tops of these tanks are below the bottom of the dock. The top of this reservoir must be lower than the floor or bottom of the dry dock so that water will flow by gravity from the dry dock into the reservoir.

16 is one of a series of valves preferably of the spectacle type. The gates of such valves pivot at the edge and swing open in a horizontal plane. Other types of valves may be used if desired.

18 is a series of transverse trusses supporting the weight of the floor of the dry dock designed to resist the hydrostatic upward pressure from below and to support the dry dock's floor above.

20 is a similar sturdy truss, running longitudinally and directly under the keel blocks on which the vessel rests. These trusses are pierced by drain openings 20a.

22 are two or more similar sturdy trusses running the length of the reservoir, preferably located where the bilge blocks are expected.

24 is an air compressor connected to a manifold 26.

28 represents a valved outlet so that portable air compressors can be attached in case an emergency requires an unusually fast unwatering of the dock.

30 is a shut-off valve between the compressor 24 and the manifold 26.

32 is a valve in a pipe connecting the manifold 26 to the pipe 28 to the open air. When the valve 32 is open it permits air from the reservoir to escape.

34 is a pipe or pipes leading from the manifold 26 through opening 36 into the reservoir 14.

38 is a control handle, handles or motor means for operating the spectacle valves 16.

40 is a water chamber along each side of the dry dock.

42 is a bulkhead separating the chamber 40 from the dry dock itself and having apertures or gratings to permit water to flow into the chamber 40 and thence through the spectacle valves 16 and into the reservoir 14, while keeping out debris of all kinds.

46 (FIG. 4) shows the extent to which the portion of the peripheral shell 10 forming the walls of the reservoir extends beyond the portion thereof forming the sides of the dry dock. This utilizes the weight of the ground above to help contain the upward hydrostatic pressure on the bottom of the reservoir. This reservoir may also extend beyond the rear wall of the dock in the same way, which would provide increased size and increased holding down weight to the subterranean chamber.

48 is a gate valve or gate valves entirely below the bottom of the reservoir. The bottom of the reservoir slopes slightly from its inboard end to its discharge end. These valves connect to outlets 50 which carry the expelled water from the reservoir in a direction to clear silt away from the entrance to the dock.

52 are the control handles, wheels or other connections for operating the gate valves 48 covering outlets 50. Hereinafter we will describe the entire cycle of operations in unwatering the dry dock and then unwatering the reservoir.

Assume that a ship has entered the dry dock, that the gate or end caisson is closed and that the dry dock is ready for unwatering. It is now necessary to close all openings into the reservoir except the escape pipe and valve to let air out of the reservoir. The spectacle valves 16 would be closed, the gate valves 48 would be closed, the valve 30 would be closed, the valve 32 would be open. The reservoir 14 would be empty.

To start unwatering the dock the spectacle valves 16 are opened slightly until the vessel sets gently but firmly on the blocks. Then, or at the outset if there is no ship in the dock, the spectacle valves 16 are opened wide and the water "dumps" into the reservoir 14. The air from the reservoir escapes through openings 36 and pipes 34 into the manifold 26 and out into the open air through valve 32, and pipe 28. These pipes, valves and openings allow air to flow freely so as not to reduce the time of unwatering.

The dry dock is now empty and the next operation is to unwater the reservoir. To do this it is necessary to close and seal off the reservoir from the dry dock and the open air. First the spectacle valves 16 are closed—then the valve 32 controlling the air discharge pipe is closed. Now no air can escape from the reservoir. The valve 30 is opened. Then the air compressor 24 is started. As soon as the air pressure in the reservoir 14 is above that represented by the head of water from the outside of the dry dock, the valves 48 are opened, the pumps 54 expel the water against a negative head, thereby attaining a much higher operating efficiency than normal. The pumps do not have to pump water against any head or pressure. Instead, there is actually a negative pressure and the pumps will help the movement of water along. The power consumption per gallon of water pumped by a pump in a conventional dry dock where water is lifted is very much greater.

When the reservoir is empty, valve 48 is closed, the compressor 24 stopped, the valve 30 closed, valve 32 is opened to let the air out and the spectacle valves 16 are opened (all consecutively) the better to drain seepage and rain water. Consequently, the sump pumps and accessories necessary in conventional dry docks are eliminated along with the large pumps and accessories.

The need for the excessive concentration of power and of standby power (all at higher unit cost) is eliminated.

A ship set in the dry dock so work can be done on it often remains for many days enabling the pumps 54 with air pressure head provided by compressor 24 to unwater the reservoir over the entire period—thus eliminating need for a heavy power demand over a shorter period of time.

When the ship is removed and the dry dock unwatered, it requires time to clear the floor of the dry dock of debris and set blocks for another ship. If, in an emergency, faster unwatering is desired, the air compressor supply line may be connected to that of the yard through valve 28 or portable compressor units of proper capacity may be provided.

However, during this time water is being steadily ejected from the reservoir. The time required to get the reservoir ready for the next unwatering can be cut down in two ways: (1) by providing extra capacity in the reservoir, and (2) by utilizing additional air pressure as described.

One of the advantages of this invention is the elimination of the otherwise thick bed of concrete under the bottom of the dock to resist the upward hydrostatic pressure of the water in the area. The horizontal and transverse trusses transform the entire reservoir into a rigid bridge-like structure, and since this rigid structure may extend laterally beyond the sides of the dock, the weight on the reservoir structure even when both dock and reservoir are empty will hold against the upward hydrostatic pressure. The need for the thick concrete bed is the need for a beam strong enough to withstand the bending moment of this pressure. The trussed structure, which may be described as a girder mat, acts as such a beam.

Access may be had to the subterranean reservoir permitting repair of the underside of the dry dock's floor or any part of the reservoir itself.

The horsepower required to lift water (i.e. to pump it out) is in direct proportion to the amount of head or lift. An important part of this invention is that of substituting air pressure to balance the weight or head of the water so that the pumps only have to move the water along, or in case of a negative head to help move the water along. The axial flow type of pumps used for this are very much more efficient than the huge centrifugal pumps in general dry dock use, thus still further reducing power requirements and the air needed can be provided by single stage compressors at a very low cost.

One embodiment of the invention has been described in detail for the purpose of illustration but it will be apparent that numerous modifications and variations may be resorted to without departing from the spirit of the invention.

The embodiment of our invention which has thus far been described is suitable for use when a new dry dock is being constructed in soft ground, where there is nothing to prevent an excavation to the necessary depth. If, however, it is desired to secure the benefits of our invention for an existing dry dock, without destroying the facilities already constructed, or to build a new dry dock where the underlying rock is close to the surface, or it is simply considered unnecessarily expensive to excavate to the depth required to construct a dry dock of the type described, it is possible to nevertheless secure the benefits of our invention by locating the reservoir at some point removed from the dock itself, where the upper surface of the ground is lower than at the site of the dry dock—usually just a little further offshore.

As shown in FIGURES 5, 6 and 7 the reservoir may then take the form of a metal tank 14a. The top of this tank 14a is below the bottom 12 of the dry dock and below the draft of any ships likely to be passing over it. The bottom of the tank 14a is connected to the chambers 40 alongside the dock by a pipe or pipes 60 and vertical chamber 61, chamber 61 being connected to chamber 40 through valved ports 16a. Axial flow pumps 54a are connected to the tops of vertical chamber 61. The top of the tank 14a is connected in the same manner and through the same valves as in the case of the embodiment shown in FIGURE 1, through pipe or pipes 62 to venting valve 32 and compressor 24. Access to the tank 14a may be obtained through the manhole 63 protected by the grating 64.

The manhole is ordinarily closed by a manhole cover 63a held down by a ring of bolts. A concentric ring of studs encircles the ring of bolts. When it is necessary to enter the tank the grating is removed and a large pipe having an inwardly projecting flanged end is dropped over the manhole. The flange is provided with holes registering with the studs encircling the manhole cover, and a sealing gasket having corresponding apertures. The pipe is then pumped out, the workmen descend along a ladder fixed to the inside of the pipe, remove the manhole cover.

The altered location of the tank creates one additional problem in that its tremendous buoyancy when empty requires that it be very firmly anchored to the bottom. This may be done by means of piles 65 sunk on opposite sides of the tank and connected across the tank by means of straps or girders 66. Since the power of a pile to support a load derives from the skin friction between it and the ground into which it is driven, such piles will present as great a resistance to lifting by the tank as they would to downward pressure exerted thereon.

The tank itself is oval in vertical cross-section, since this shape requires less height so that the tank may be anchored in shallower water than that which would be required for a round tank. A thin coating of concrete 67 suffices to protect the top of the tank. Its interior is not divided into cubicles, but is provided with trusses and/or girders 68 running both longitudinally and transversely of the tank to hold it in shape against external pressure when empty and internal pressure when full. Compartments or supporting plates are not suitable, since they would interfere with the filling and emptying of the tank.

The embodiment of our invention just described functions in exactly the same way as the one first described.

To unwater the dock the tank is vented to atmosphere through the pipes 62 by opening venting valve 32, and closing the valve between pipe 62 and compressor 24. The valves at ports 16a are then opened and water flows from the dock to the tank purely by gravity.

When the reservoir is to be emptied, the venting valve 32 is closed, the valve between pipe 62 and the compressor 24 is opened, and the valved ports 16a are closed. The compressor is then started, thus building up pressure in the tank. When this is greater than that represented by the head of water in the tank, the pumps are started, and work at high efficiency against a negative head.

What we claim is:
1. The combination of a dry dock disposed in the ground adjacent a body of water and comprising an enclosure having a bottom, a peripheral shell and a transverse horizontal partition spaced above said bottom, said partition separating said enclosure into an upper dry dock chamber having said partition as the floor thereof and a lower drain chamber having said partition as the ceiling thereof, gate means provided in said peripheral shell and when open communicating the stated body of water with said dry dock chamber only whereby the latter may be filled with water to the level of the stated body of water, said drain chamber having a capacity greater than said dry dock chamber, valved conduit means connecting said dry dock chamber to said drain chamber whereby when said gate means are closed and said valved conduit means are open water may be drained at a relatively fast rate by gravity from said dry dock chamber into said drain chamber to make the dry dock chamber empty, closable vent means communicating said drain chamber with the atmosphere, pump means communicating the drain chamber with the stated body of water whereby water may be emptied at a relatively slow rate from the former into the latter subsequent to and independently of the emptying of said dry dock chamber, and means for delivering compressed air to said drain chamber at a pressure such that it approximately counterbalances the head against which said pump means operates to empty said chamber.

2. The combination as defined in claim 1 together with a set of intersecting reinforcing members provided at the underside of said partition and dividing the upper portion of said drain chamber into a plurality of cubicles, said reinforcing members having openings communicating said cubicles with one another for passage of water and air therethrough.

3. In a dry dock having a supporting bottom floor and having gate means communicating with an external body of water, a reservoir comprising a sealed chamber having its top below the level of the dock floor and having a capacity exceeding that of the dock, conduit means permitting water to flow by gravity from the dock into the reservoir, valve means provided in said conduit means for controlling the flow of water therethrough, other conduit means connecting the upper portion of said reservoir with the open air and provided with venting valve means for selectively preventing and permitting escape of air from the reservoir to the open air, an axial flow pump having its inlet end connected to said reservoir, and means for supplying compressed air to said reservoir at a pressure approximately equal to the head at the outlet to said axial flow pump, whereby when said valve means are closed and said compressed air means and pump are operated, water is drawn from said tank, but when said valve means are open and said pump and compressor still, water flows by gravity from said dock into said tank.

4. The combination of a dry dock disposed in the ground adjacent to a body of water, a drain tank with a capacity greater than that of the dry dock, and located below the bottom of said dry dock near the bottom of said adjacent body of water at a distance from the shore such that the top of the tank is deeper at low tide than the keel of the deepest draft vessel which the dock will accommodate, conduit means connecting the dry dock to the drain tank, gate means provided at the dry dock end of said conduits to allow water in the dry dock to flow rapidly by gravity into the drain tank when open and prevent water from flowing into the drain tank when closed, valved vent means which when open connect said drain tank with the atmosphere, axial flow pump means communicating the drain tank with the stated body of water whereby the drain tank may be rapidly emptied into the stated body of water independent of the emptying of the dry dock; and compressed air means connected to said tank to provide air pressure on the surface of the water in the tank, approximately equal to the head against which said pump means operates to empty said chamber.

5. The combination as defined in claim 4 together with piles driven at intervals along each side of the drain tank, and strong securing means passing over the drain tank securely fastened at each end to the top of the pile.

6. The combination as defined in claim 4 together with a manhole in the top of the drain tank, a ring of studs projecting upwards from the upper surface of the drain tank concentric and outside of the ring of bolts and nuts holding the manhole, a cofferdam flume shaped long enough to reach from the top of the drain tank to the surface of the water at high tide, said cofferdam having a flange at the lower end with bolt holes to match the ring of studs above-mentioned so that when access to the tank is necessary the cofferdam can be placed over the ring of studs with a gasket and bolted down so that water can be pumped out of the cofferdam and access to the drain tank be thereby obtained.

References Cited in the file of this patent

UNITED STATES PATENTS

| | | |
|---|---|---|
| 634,554 | Gartz | Oct. 10, 1899 |
| 721,222 | O'Rourke | Feb. 24, 1903 |
| 890,769 | Hewett | June 16, 1908 |
| 1,272,679 | Lake | July 16, 1918 |
| 1,526,447 | Williams | Feb. 17, 1925 |
| 1,785,528 | O'Rourke | Dec. 16, 1930 |
| 2,474,920 | Stearns | July 5, 1949 |
| 2,652,693 | Goldman et al. | Sept. 22, 1953 |
| 2,747,774 | Britenbach | May 29, 1956 |
| 3,036,438 | Sims | May 29, 1962 |

FOREIGN PATENTS

| | | |
|---|---|---|
| 373,045 | Great Britain | May 19, 1932 |